(12) United States Patent
Medvedeva et al.

(10) Patent No.: US 11,461,245 B2
(45) Date of Patent: Oct. 4, 2022

(54) BLOCKCHAIN OPERATION STACK FOR REWRITABLE BLOCKCHAIN

(71) Applicants: Accenture Global Solutions Limited, Dublin (IE); GSC Secrypt, LLC, Hoboken, NJ (US)

(72) Inventors: Elena Yurievna Medvedeva, Tver (RU); Maksim Aleksandrovich Pavlov, Tver (RU); Ilya Aleksandrovich Trofimov, Tver (RU); Giuseppe Ateniese, Hoboken, NJ (US); John Velissarios, London (GB)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/764,786

(22) PCT Filed: Nov. 16, 2017

(86) PCT No.: PCT/RU2017/000866
§ 371 (c)(1),
(2) Date: May 15, 2020

(87) PCT Pub. No.: WO2019/098873
PCT Pub. Date: May 23, 2019

(65) Prior Publication Data
US 2020/0371965 A1    Nov. 26, 2020

(51) Int. Cl.
*G06F 12/14* (2006.01)
*G06F 11/30* (2006.01)
*G06F 21/60* (2013.01)

(52) U.S. Cl.
CPC ........ *G06F 12/1408* (2013.01); *G06F 21/602* (2013.01); *G06F 2212/1052* (2013.01)

(58) Field of Classification Search
CPC ............... G06F 12/1408; G06F 21/602; G06F 2212/1052
(Continued)

(56) References Cited

U.S. PATENT DOCUMENTS

| 5,534,855 A | 7/1996 | Schockley et al. |
| 6,108,783 A | 8/2000 | Krawczyk et al. |

(Continued)

OTHER PUBLICATIONS

Zhongxing Ming; Blockcloud: A Blockchain-based Service-centric Network Stack; The Hong Kong Polytechnic University; Year: 2018; pp. 1-19.*

(Continued)

*Primary Examiner* — Monjur Rahim
(74) *Attorney, Agent, or Firm* — Crowell & Moring LLP

(57) ABSTRACT

A system and method includes a blockchain operation stack which may control access to reading and writing operations for a blockchain. The blockchain operation stack may include a credential authority layer that may control permissions for profiles maintained by the credential authority layer. When the permissions are granted by the credential authority layer, a presentation layer may generate a display that may include information on the blockchain structure. Integrity outputs stored in a successor block may verify that a predecessor block has been rewritten and is valid. The presentation layer may provide tools to facilitate write layer operations to rewrite and append to the blockchain.

20 Claims, 8 Drawing Sheets

(58) Field of Classification Search
USPC .......................................................... 713/189
See application file for complete search history.

(56) References Cited

U.S. PATENT DOCUMENTS

| | | | |
|---|---|---|---|
| 6,292,897 B1* | 9/2001 | Gennaro | H04L 9/321 |
| | | | 713/180 |
| 7,730,319 B2 | 6/2010 | Razman et al. | |
| 9,436,923 B1 | 9/2016 | Sriram et al. | |
| 9,667,416 B1 | 5/2017 | Machani et al. | |
| 9,679,276 B1 | 6/2017 | Cuende | |
| 9,774,578 B1* | 9/2017 | Ateniese | H04L 63/061 |
| 9,785,369 B1 | 10/2017 | Ateniese et al. | |
| 9,959,065 B2 | 5/2018 | Ateniese et al. | |
| 9,967,088 B2 | 5/2018 | Ateniese et al. | |
| 9,967,096 B2 | 5/2018 | Ateniese et al. | |
| 2002/0013898 A1 | 1/2002 | Sudia et al. | |
| 2002/0099946 A1* | 7/2002 | Herbert | H04L 9/3247 |
| | | | 713/193 |
| 2002/0164033 A1 | 11/2002 | Rajasekaran | |
| 2002/0194209 A1 | 12/2002 | Bolosky et al. | |
| 2004/0107341 A1 | 6/2004 | Hall et al. | |
| 2007/0223706 A1* | 9/2007 | Gantman | G06F 21/602 |
| | | | 380/286 |
| 2007/0226514 A1 | 9/2007 | Maletsky | |
| 2007/0294205 A1 | 12/2007 | Xu et al. | |
| 2008/0104407 A1 | 5/2008 | Horne et al. | |
| 2008/0195583 A1 | 8/2008 | Hsu et al. | |
| 2009/0006853 A1 | 1/2009 | Li | |
| 2009/0024848 A1 | 1/2009 | Takasugi et al. | |
| 2009/0193256 A1 | 7/2009 | Takenaka et al. | |
| 2009/0271631 A1 | 10/2009 | Teranishi | |
| 2010/0005306 A1 | 1/2010 | Izu et al. | |
| 2010/0037056 A1 | 2/2010 | Follis et al. | |
| 2010/0046749 A1 | 2/2010 | Hatano et al. | |
| 2010/0110935 A1 | 5/2010 | Tamassia et al. | |
| 2010/0153732 A1 | 6/2010 | Su | |
| 2010/0169653 A1 | 7/2010 | Takenaka et al. | |
| 2011/0137916 A1 | 6/2011 | Deen et al. | |
| 2012/0072732 A1 | 3/2012 | Canard et al. | |
| 2014/0245020 A1 | 8/2014 | Buldas et al. | |
| 2015/0006899 A1 | 1/2015 | Seo et al. | |
| 2015/0025934 A1 | 1/2015 | Mashima et al. | |
| 2015/0046337 A1 | 2/2015 | Hu et al. | |
| 2015/0121062 A1 | 4/2015 | Gajek et al. | |
| 2015/0128283 A1 | 5/2015 | Mashima et al. | |
| 2015/0207625 A1 | 7/2015 | Sathaye et al. | |
| 2015/0244690 A1 | 8/2015 | Mossbarger | |
| 2015/0332283 A1 | 11/2015 | Witchey | |
| 2015/0332395 A1 | 11/2015 | Walker et al. | |
| 2015/0356555 A1 | 12/2015 | Pennanen | |
| 2015/0378842 A1 | 12/2015 | Tomlinson et al. | |
| 2016/0027229 A1 | 1/2016 | Spanos et al. | |
| 2016/0085955 A1 | 3/2016 | Lerner | |
| 2016/0110261 A1 | 4/2016 | Parab et al. | |
| 2016/0110292 A1 | 4/2016 | Choi et al. | |
| 2016/0125403 A1 | 5/2016 | Hu et al. | |
| 2016/0162897 A1 | 6/2016 | Feeney | |
| 2016/0191243 A1 | 6/2016 | Manning | |
| 2016/0204942 A1 | 7/2016 | Bohli et al. | |
| 2016/0212109 A1 | 7/2016 | Hird | |
| 2016/0212146 A1 | 7/2016 | Wilson | |
| 2016/0218879 A1 | 7/2016 | Ferrin | |
| 2016/0292396 A1 | 10/2016 | Akerwall | |
| 2016/0321654 A1 | 11/2016 | Lesavich et al. | |
| 2016/0328424 A1 | 11/2016 | Borley et al. | |
| 2016/0330034 A1 | 11/2016 | Back et al. | |
| 2016/0344737 A1 | 11/2016 | Anton et al. | |
| 2016/0358135 A1 | 12/2016 | Liao et al. | |
| 2016/0358165 A1 | 12/2016 | Maxwell | |
| 2017/0031676 A1 | 2/2017 | Cecchetti et al. | |
| 2017/0034217 A1 | 2/2017 | Anton et al. | |
| 2017/0046693 A1 | 2/2017 | Haldenby et al. | |
| 2017/0046806 A1* | 2/2017 | Haldenby | G06Q 20/102 |
| 2017/0048217 A1 | 2/2017 | Biggs et al. | |
| 2017/0109735 A1 | 4/2017 | Sheng et al. | |
| 2017/0115976 A1* | 4/2017 | Mills | G06Q 10/06 |
| 2017/0132630 A1 | 5/2017 | Castinado et al. | |
| 2017/0163733 A1 | 6/2017 | Grefen et al. | |
| 2017/0180134 A1 | 6/2017 | King | |
| 2017/0213209 A1 | 7/2017 | Dillenberger | |
| 2017/0220815 A1 | 8/2017 | Ansari et al. | |
| 2017/0279774 A1 | 9/2017 | Booz et al. | |
| 2017/0330174 A1 | 11/2017 | Demarinis | |
| 2018/0006831 A1 | 1/2018 | Toll et al. | |
| 2018/0218003 A1 | 8/2018 | Banga et al. | |
| 2018/0268382 A1 | 9/2018 | Wasserman | |
| 2019/0074962 A1* | 3/2019 | Ateniese | G06F 16/182 |
| 2019/0268319 A1* | 8/2019 | Kurian | H04L 63/08 |
| 2020/0134139 A1 | 4/2020 | Vaish | |
| 2020/0228512 A1* | 7/2020 | Ateniese | G06F 21/53 |
| 2020/0371965 A1 | 11/2020 | Medvedeva | |
| 2021/0036860 A1 | 2/2021 | Ranganathan et al. | |
| 2021/0234669 A1* | 7/2021 | Singh | H04L 63/0435 |

OTHER PUBLICATIONS

Treat, David, "editing the Uneditable, Blockchain needs to adapt to an imperfect world", Retrieved from the Internet on Dec. 13, 2019, pp. 1-3, published online by Accenture at URL https://www.accenture.com/in-en/insight-editing-uneditable-blockchain.

Lumb, Richard et al., "Why distributed ledger technology must adapt to an imperfect world," Accenture—Editiing Uneditable Blockchain, Retrieved from the Internet on Dec. 13, 2019, pp. 1-8, published online by Accenture at URL https://www.accenture.com/acnmedia/PDF-33/Accenture-Editing-Uneditable-Blockchain.pdf#zoom-50.

Communication pursuant to Rules 161(1) and 162 EPC for corresponding EP Application No. 17817933.9, dated Jun. 23, 2020, 3p.

Communication pursuant to Article 94(3) EPC, in Europe Application No. 17817933.9, dated Nov. 8, 2021, 7 pages.

Accenture's "*Editable Blockchain Prototype Draws Criticism,*"CryptoCoinsNews, cryptocoinsnews.com, Sep. 28, 2016, pp. 1-3.

Ateniese, G et al., "A Provably Secure Nyberg-Rueppel Signature Variant with Applications," International Association for Cryptologic Research IACR) ePrint, 2004, pp. 1-17.

Ateniese, G et al., "Sanitizable Signatures," European Symposium on Research in Computer Security, 2005, LNCS 3679, pp. 159-177, Springer-Verlag Berlin, Heidelberg, 2005.

Ateniese, Giuseppe et al., "*On the Key Exposure Problem in Chameleon Hashes, Security in Communication Networks,*" (SCN) 2004, Lecture Notes in Computer Science, vol. 3352, Springer, Berlin, Heidelberg, pp. 1-16.

Ateniese, Giuseppe, et al., "*Identity-Based Chameleon hash and Applications,*" FC 2004, LNCS, vol. 3110, Springer-Verlag (2004), pp. 164-180.

Birch, D., "*Mutable and Immutable Blockchain,*" LinkedIn.com, Nov. 2, 2016, pp. 1-14.

Decker, Christian et al., "*Bitcoin, Transaction Malleability and MtGox, Network and Parallel Computing,*" Springer International Publishing, Cham, Switzerland, vol. 8713 (2014), pp. 313-326.

Essentially Optimal Robust Secret Sharing with Maximal Corruptions, Nov. 5, 2015, Cryptology ePrint Archive, pp. 1-38.

Goodman, L.M., "Tezos: A Self-Amending Crypto-Ledger Position Paper," Aug. 3, 2014 (2014).

Juels, A, et al., "*PORs: Proofs of Retrievability for Large Files,*" In ACM Conference on Computer and Communications Security, CCS 2007, pp. 584-597. ACM.

Larimer, D., "*Momentum—A Memory-Hard Proof-of-Work via Finding Birthday Collisions,*" Invictus Innovations Inc., Tech. Rep., Oct. 2013.

Moore, C., "*How Accenture Hacked the Blockchain,*" LinkeIn.com., Nov. 2, 2016, pp. 1-14.

Puddu, Ivan, et al., "µ*chain: How to Forget without Hard Forks,*" https://www.airbnb.com and https://gitlab.inf.ethz.ch/puddui/fabric, dated Feb. 10, 2017, (21p).

(56) References Cited

OTHER PUBLICATIONS

Rabin, T., "*Verifiable Secret Sharing and Multiparty Protocols with Honest Majority*," (Extended Abstract), STOC '89 Proceedings of the Twenty-First Annual ACM Symposium on Theory of Computing, Association for Computing Machinery (ACM) Digital Library, May 14-17, 1989, pp. 73-85.

Rass, S., "*Dynamic Proofs of Retrievability From Chameleon-Hashes*," in SECRYPT '13. SciTePress, 2013, pp. 296-304.

Zheng, Q, et al., "*Fair and Dynamic Proofs of Retrievability*," In Proceedings of the first ACM Conference on Data and Application Security and Privacy, CODASPY, 2011, New York, Ny, USA. ACM, pp. 237-248.

Zyskind, Guy, et al., "*Enigma: Decentralized Computation Platform with Guaranteed Privacy*."guyz@mit.edu, oznathan@gmail.com, pentland@mit.edu, Jun. 6, 2015, (14p).

Giuseppe Ateniese et al., "Redactable Blockchain -- or -- Rewriting History in Bitcoin and Friends", International Association For Cryptologic Research,,vol. 20170214:204959, Feb. 14, 2017 (Feb. 14, 2017), p. 1-38.

International Search Report for International Application No. PCT/RU2017/000866, dated Jul. 19, 2018.

Written Opinion of the ISA for International Application No. PCT/RU2017/000866, dated Jul. 19, 2018.

\* cited by examiner

US 11,461,245 B2

BLOCKCHAIN OPERATION STACK FOR REWRITABLE BLOCKCHAIN

PRIORITY

This application is the U.S. National Stage Application of PCT Application No. PCT/RU2017/000866, filed on Nov. 16, 2017, designating the United States, titled Blockchain Operation Stack for Rewritable Blockchain, the contents of which are incorporated herein by reference.

TECHNICAL FIELD

This disclosure relates to data verification, validation, and re-writing in complex real-world systems.

BACKGROUND

Rapid advances in electronics and communication technologies, driven by immense customer demand, have resulted in the widespread adoption of electronic transactions and record keeping. As one example, e-currencies, such as Bitcoin, have displaced paper currencies in millions of transactions per year. Improvements in the verification and recordation of such electronic transactions will continue to increase the features and options available to operators engaging in electronic transactions.

DETAILED DESCRIPTION

Figure 1:
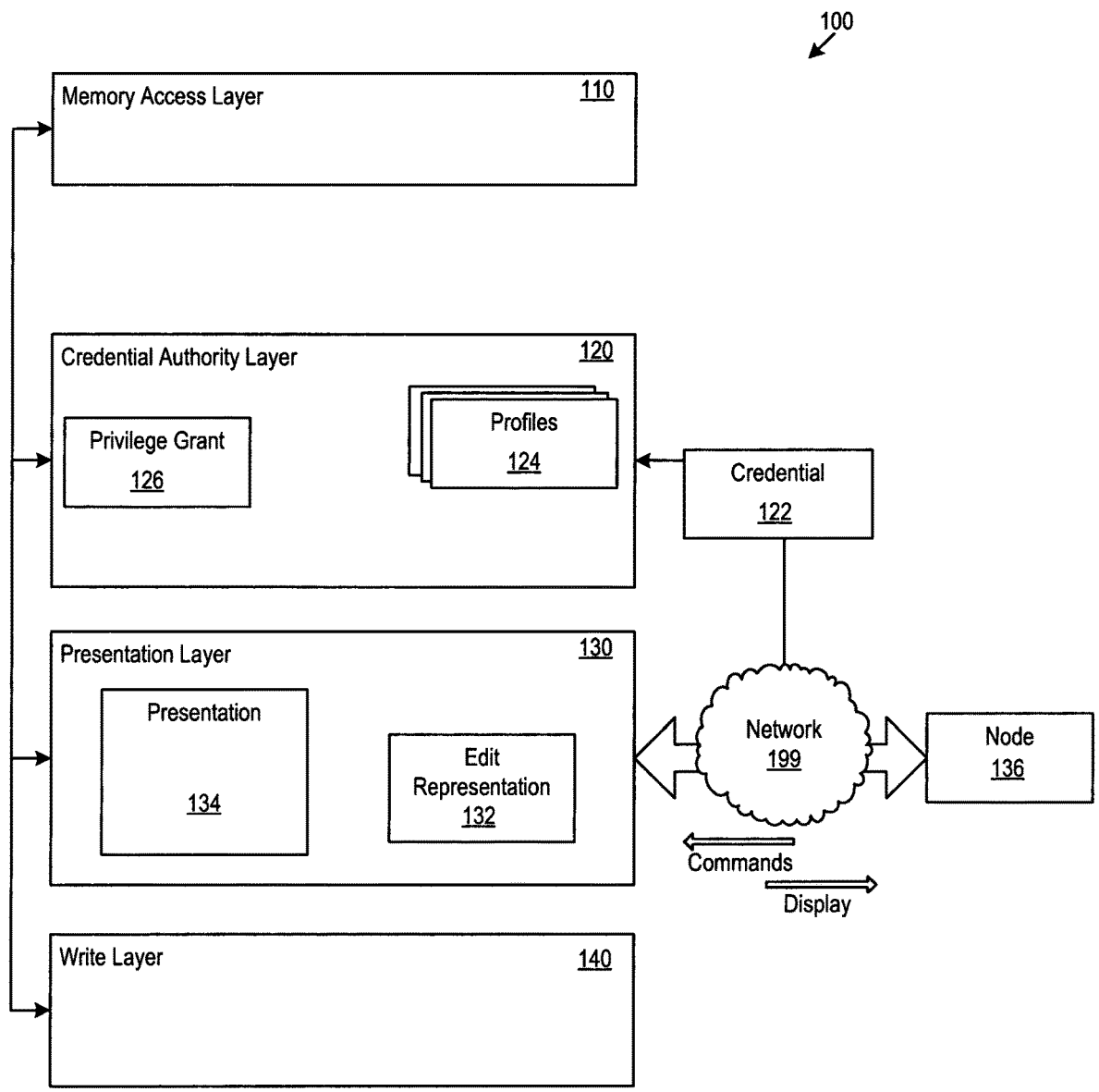
FIG. 1 shows an example blockchain operation stack.

A blockchain includes a linked series of data blocks. The data blocks include a code, such as a cryptographic hash or checksum, which may be coding-consistent with the content of previous blocks in the series. In some cases, determining multiple different sets of blocks that produce the same integrity code may be insoluble, prohibitively computationally complex, or otherwise effort intensive enough to frustrate attempts to tamper with the contents of the blockchain while maintaining the self-consistency of the integrity codes. However, in some implementations a trusted party may have access to a key secret, or portion of a key secret, such that the party, acting alone or with those in possession of the other portions of the key secret, may edit the blockchain contents without leaving indication of tampering. In some cases, the system may rely on cryptologic architectures and techniques may be used to obscure or obfuscate data, prevent publication of security keys (e.g., key secrets), facilitate private key exchanges, or otherwise control data access and knowledge acquisition through data scrambling and/or cyphering.

In various systems multiple parties may use a blockchain-based file or ledger to maintain a tamper-evident record of events, transactions, data, program code, etc. or other updates. In some cases, a blockchain may register tampering after a change made to the blockchain by an untrusted party, for example a party not in possession of the key secret. Thus, the parties may individually verify that updates by other parties are valid and coding-consistent with the previous data blocks of the blockchain. The self-consistency of the integrity codes allows the updates to the blockchain to be verified even if the party lacks an archived version of the blockchain to use as a reference. When a rewrite to one or more data blocks in a blockchain does not introduce coding-inconsistency among the integrity outputs and data block contents of the blocks in the blockchain, the rewrite may be characterized as preserving the validity of the blockchain.

A blockchain may be secured by an integrity code. An integrity code may produce a particular integrity output when particular data is provided as input to the integrity code. In some cases, when data different than the particular data is provided to the integrity code as input, the integrity code may produce a different integrity output. In an example scenario an integrity output from the integrity code generated from particular input data from a data block is stored and the data block is later changed. If the changed data is provided to the integrity code as input, the integrity code may produce an integrity output that is different or otherwise coding-inconsistent with the stored integrity output. Therefore, the change may be detected in this example scenario.

A blockchain may include a series of blocks where each subsequent block in the series holds the integrity output for a previous block. The series may form a chain of blocks in which each subsequent block holds an integrity output generated from the data present in the immediately prior block. Accordingly, if a block is changed, a coding-inconsistency with the integrity output stored in a subsequent block may be detected. Since the integrity outputs are part of the stored data in the blocks, changes to the integrity outputs themselves may also be detected through coding-inconsistencies. This self-consistency of the integrity code may be used to secure a blockchain with respect to covert tampering.

When secured by an integrity code, a tamper-evident change may include virtually any change for which a coding-inconsistency between the integrity outputs of the integrity code for a blockchain and the data within the blockchain can be detected. For example, the data in a block of the blockchain may be hashed, run through a checksum, or have another integrity code applied. If the data in the block is later found to conflict with the integrity output of the hash, checksum, or other integrity code, the change may be identified as tamper-evident. A conflict may occur when the data currently in a block does not produce an identical or equivalent integrity output to the earlier obtained integrity output when the integrity code is applied to the data currently in the block. When a change is made to a block and no coding-inconsistency with the previously stored integrity outputs of the integrity code can be detected afterward, that change may be non-tamper-evident. In some cases, a non-tamper-evident rewrite may be implemented by substituting a first block with a second block with different data content that produces the same (or an equivalent) integrity output.

In some cases, after entry, some blocks in a blockchain may include information that is no longer appropriate for inclusion in the blockchain. For example, blocks may expire after time or after a determined number of subsequent entries, private information may be included in the blocks, inaccurate entries may be included in the blocks, information prejudicial to one or more of the parties using the blockchain may be included in the blocks, incomplete information may be included, or other inappropriate information may be included. Accordingly, a trusted party, for example a neutral third party, a governing party, or a group of individually untrusted parties, may rewrite, remove, or supplement data included in the blocks in a non-tamper-evident fashion. For example, the techniques and architectures described in U.S. patent application Ser. No. 15/596,904, filed May 16, 2017, titled Rewritable Blockchain, and incorporated by reference in its entirety, may be used to preform blockchain maintenance, control and rewriting. Further these techniques and architectures may be integrated with, in some implementations perform the roles of, the techniques and architectures discussed below.

Blockchain rewrites may be used to perform low level (e.g., from a hardware architecture standpoint) operations such as memory rewrites, deletions, and additions. Accordingly, the techniques and architectures may improve the operation of the underlying hardware of a computer system because the system may utilize blockchain protocols for storing data for which verifiability is implemented. For example, operating system software for secure systems may be stored in blockchain payloads to protect the data from manipulation by malware, unauthorized parties, unauthorized devices, or other unintended/unauthorized alterations.

In addition, the ability of a trusted party to rewrite a blockchain may improve tamper-resistance by providing an established rewrite solution. Accordingly, rather than having to jettison a blockchain, e.g., due to undesired, inaccurate, or inappropriate content, a trusted party may instead rewrite the existing blockchain. Accordingly, blockchain rewrite dramatically improves system efficiency and reduces resource expenditure, compared to recreating a new blockchain. Blockchain rewrite may also reduce the probability of a malicious party using a defunct blockchain, which may have been discarded due to inappropriate content, to spoof a system by notifying the system that it did not receive a prior notification of the blockchain discard. Accordingly, the rewritable blockchain may have the additional technical effects of improved data security and tamper-resistance. In other words, the techniques and architectures discussed herein comprise concrete, real-world applications of and improvements to existing technologies in the marketplace.

Further, the techniques and architectures, including block operation stacks and other techniques and architectures discussed require one to proceed contrary to accepted wisdom. In particular, conventional approaches may not necessarily integrate blockchain profile control with edit representations and blockchain rewriting in an operation stack or integrated module environment because, among other reasons, blockchain key secrets and consensus systems may be implemented to prevent unauthorized alterations, changes, and/or access to a blockchain. For example, credential authority layers capable of generating privilege grants may not necessarily be integrated with presentation layers for capable of causing display of blockchain data within an operation stack or integrated module environment.

In some implementations, entities with knowledge of a key secret may make alterations to the blockchain. This key secret could be in the possession, in whole or in part, of operators, a centralized auditor, or other parties. Additionally or alternatively, shares (e.g., portions) of the key could be distributed among several individually untrusted parties. The integrity code may be a virtual padlock on the link connecting two blocks.

The blockchain may include one or more data blocks that are secured by an integrity code. For example, a rewrite-protected cryptographic hash function, such as a hash function without a key secret for allowing non-tamper-evident rewrites, a chameleon hash, cyclic redundancy checks (CRCs), checksums, or other integrity codes may be used to secure the data blocks within the blockchain. In some implementations, the individual data blocks may be secured by a particular integrity output that is coding-consistent with the data content of the block. For example, an integrity output may be coding-consistent with the content of block when applying the integrity code to the contents of the block that produces that integrity output. When an integrity output is coding-consistent with the data that it secures, the data may be deemed valid. As discussed above, that particular integrity output may be placed within a neighboring block to prevent or frustrate attempts to rewrite the data content in a non-tamper-evident fashion or in a tamper-evident but validity preserving fashion.

The system may access a key secret, such as a cryptographic key or trapdoor information that is paired to the integrity code of the blockchain. The key secret may include data that allows the system, to compute collisions, e.g., two different data blocks that produce the same integrity output for the integrity code. Using the computed collisions, a device may rewrite the blockchain without the rewritten blocks being coding-inconsistent with the integrity code. For example, an operator may instruct a system compute a collision using a key secret and rewrite a blockchain.

The key secret to open the virtual padlock can be managed according to the requirements of specific applications. For example, in a business negotiation (or government treaty negotiations) a key secret allowing alteration of proposed contract (treaty) terms may be held by neutral third party. Additionally or alternatively, equal portions (e.g., halves, thirds) of the key secret may be held by each party in the negotiation, such that terms may be altered with the consent of all parties or a defined plurality of the parties. In collaborative software design implementations, key secrets may be distributed in portions to stakeholders to enforce consensus before allowing alteration to certain software code. Below, example key secret distribution schemes are discussed, including centralized and distributed schemes. However, other schemes are possible.

Figure 2:
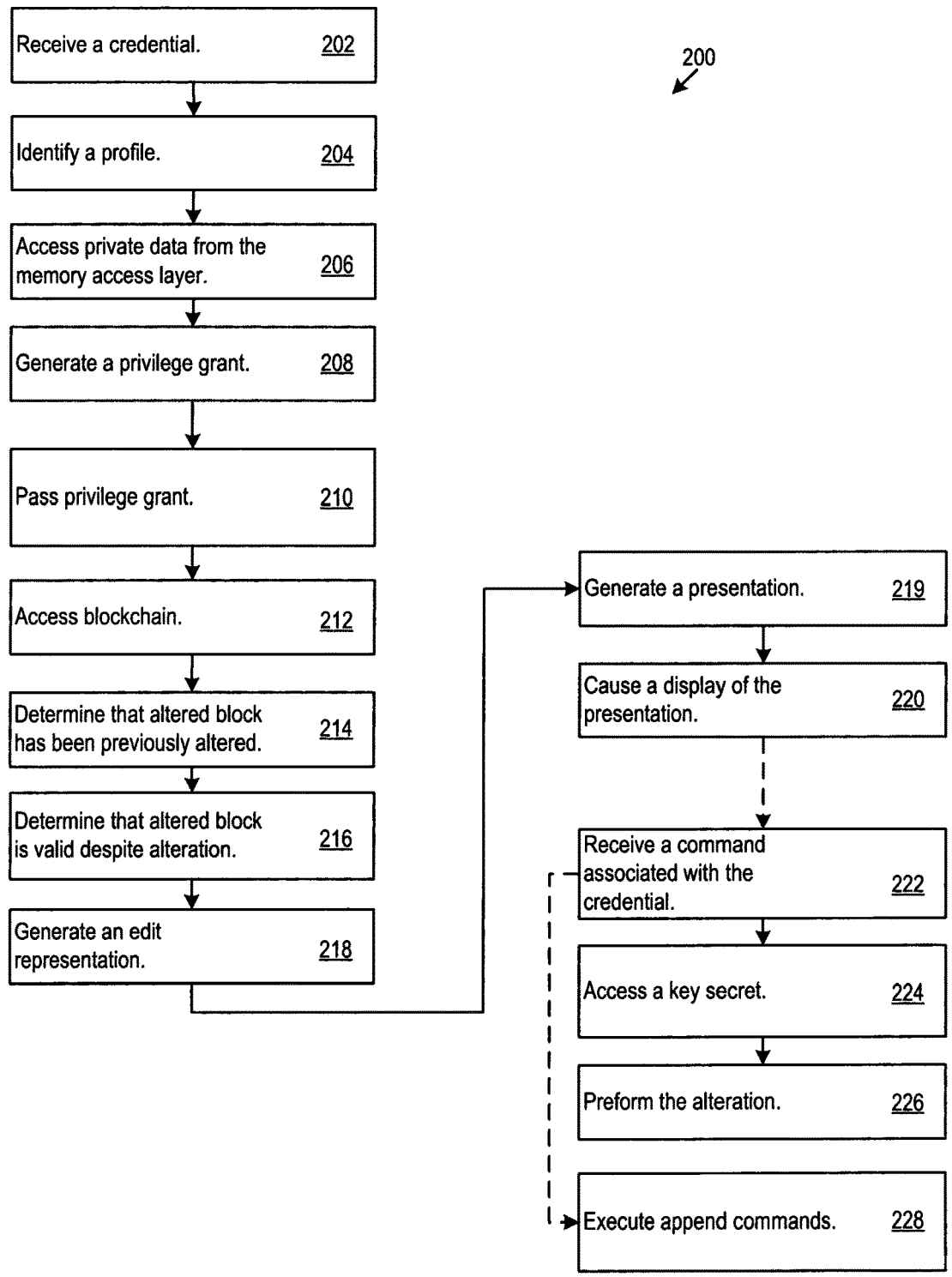
FIG. 2 shows example blockchain logic.

Referring now to FIG. 1, an example blockchain operation stack 100 and FIG. 2 showing complimentary blockchain operation logic 200, which may be implemented on blockchain operation circuitry are discussed. The blockchain operation stack 100 may include a memory access layer 110, a credential authority layer (CAL) 120, a presentation layer 130, and write layer 140.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing and/or communication. As one example for the blockchain operation stack 100, the memory access layer 110 may provide hardware-based memory resource access for the presentation layer 130. This may include blockchain memory access operations such as read operations or write operations. Hence, the memory access layer 110 may provide a hardware resource, e.g., hardware-based memory resources, to the presentation layer. Accordingly, the blockchain operation stack 100 architecture improves the operation of the underlying hardware by, for example, improving the efficiency by which hardware resources are provided to the stack layers.

Referring now to FIG. 2, the CAL 120 may receive a credential 122 (202). For example, the CAL 120 may receive the credential 122 over communication interface from node 136; via a user interface (e.g., user interface 318, discussed below); or via other interfaces configured to receive data or human input. The credential 122 may include operator logons, certificates, personal identification numbers (PINs), biometric scans, private codes, or other private data to determine permissions. Responsive to the credential, the CAL 120 may identify a profile 124 and a level of access responsive to the profile 124, the credential 122 or both (204). For example, a profile may be associate with multiple access levels depending on the credential submitted. In an example scenario, a signal profile owner may maintain multiple security levels on the same profile and the level of access granted at logon may depend on the credential submitted. The credential 122 may include a profile identifier such as an account name or username. In some cases, metadata provided along with or within the credential may be used to identify an associated account. For example, header data from a network packet may identify an origin, similarly a hardware address or customized identifier field may be used.

The profile 124 may be maintained by the CAL 120. The CAL 120 may store sensitive or otherwise private data for the profile via memory operations at the memory access layer 110 (206). Private data may include credential verification data (e.g., data used in confirming the authenticity of a credential), key secrets for blockchain rewrite access, or other private data. In some cases, the private data may be stored on protected memory (e.g., protected memory 380 (discussed below)).

Once a level of access is selected, the CAL 120 may generate a privilege grant 126 including one or more privileges for a blockchain (208). For example, privileges may include: reading privileges which may allow read-level access to blocks of the blockchain, appending privileges which may allow the use of append commands that add blocks to the blockchain without altering existing blocks, rewrite privileges which allow alteration to existing blocks. In some implementations, the privileges may be contingent upon access to additional resources beyond the privilege itself or other constraints. For example, rewrite privileges may be dependent on additional access to associated key secrets for the integrity codes of the blockchain. Additionally or alternatively, appending privileges may be contingent upon compliance with a blockchain consensus mechanism for blockchain.

For example, in some cases, blockchains may be used with proof-of-work based consensus mechanisms. Accordingly, operators, e.g., untrusted operators, may be granted the ability to append a block to the blockchain upon finding a solution of a pre-defined challenge and showing proof-of-work for the solution. In some implementations, consensus mechanisms based on "practical Byzantine fault tolerance" may be implemented. Further, some implementations may use "smart contract" type consensus mechanisms where operators may append blocks upon a showing of compliance with the terms or rules of the smart contract. In consensus based systems, append privileges and consensus compliance may together be sufficient to allow an operator to execute blockchain append operations. However, in some cases consensus may not necessarily be enforced for a blockchain.

In some implementations, the blockchain may include multiple block types. For example, a blockchain may include invocation blocks that include input parameters for operation of chaincode which implements blockchain ledger functionality (or other blockchain functionality) and chaincode blocks which store the chaincode itself. In some cases, privilege grants may specify a block type to which the privileges apply. In an example scenario, read privileges may apply to all block types, while append or rewrite privileges apply to fewer than all the blocks, such as invocation blocks but not chaincode blocks (or vice versa). Other block types may be used. Further, the CAL 120 may grant privileges targeted to all blocks or any subset of types. Additionally or alternatively, the CAL 102 may assign privileges at a block specific level, e.g., using block identifiers (discussed below).

Once the CAL 120 determines the privilege grant 126, the CAL 120 may pass the privilege grant 126 to the presentation layer 130, the write layer 140, or both (210).

The presentation layer 130 may access the blockchain via memory operations at the memory access layer 110 (212). For example, the presentation layer 130 may access the content of selected blocks or the entire blockchain. In an example scenario, the presentation layer may access a selected block, which may have been altered by the system in a previous transaction, and a successor block in the chain that include the integrity codes securing the selected block.

In the case of an altered block, the presentation layer 130 may determine that the altered block has been previously altered based on coding-inconsistent with an integrity code stored within the successor block (214). The presentation layer 130 may determine that the altered block is valid despite the alteration based on a second integrity output stored within the successor block that is coding-consistent with the altered block (216). Such multiple integrity output blocks may be implemented in accord with dual and multiple-link blockchains as discussed below.

When the privilege grant includes a reading privilege, the presentation layer may generate an edit representation 132 for the altered block (218). The edit representation 132 may include an audio or visual representation of the altered status of the altered block. For example, the block may be displayed as a different color from other unaltered blocks. In some implementations words, characters, or symbols indicative of alteration may be super-imposed on or placed proximate to the altered block. In additional implementations, arrows, connectors, or other relationship indicators may be used to represent coding-consistency (or coding-inconsistency) with a successor block. In still other implementations, editing may be apparent from an indication of a coding-inconsistency with one or more integrity outputs stored in a successor block, e.g., a block subsequent to the altered block in a blockchain (or other integrity code construct) sequence.

The presentation layer 130 may generate a presentation 134 that includes the portion of the blockchain with the edit representation 132 (219). In some implementations, the entire blockchain may be represented in the presentation 134 along with edit representation 132. In some scenarios with multiple altered blocks within the blockchain, multiple edit representations may be included in the presentation. In some implementations, multiple blockchains or portions of multiple blockchains may be included. Accordingly, the presentation layer 130 may be invoked to view comparisons of blockchains or comparisons of different versions of the same blockchain.

Once the presentation 134 is generated, the presentation layer 130 may cause a display of the presentation (220). For example, the presentation layer 130 may cause the display be sending instructions or other data over a network 199 for display at a node 136. The presentation layer 130 may use a communication interface to effect the transfer. Additionally or alternatively, the presentation layer 130 may cause display of the presentation 134 on a locally controlled or connected display via user interface.

Additionally or alternatively, the presentation 134 may further allow for user-selection-based input to view or modify the blockchain at the block and/or block content level. For example, an operator may view the presentation 134 and select a block via user input (e.g., via local interface input or via network communications). Responsive to receiving the user input, the presentation layer 130 may adapt the presentation. For a block selection, the presentation layer 130 may add and/or populate an informational panel to the presentation. The informational panel may include block or blockchain specific data.

Figure 4:
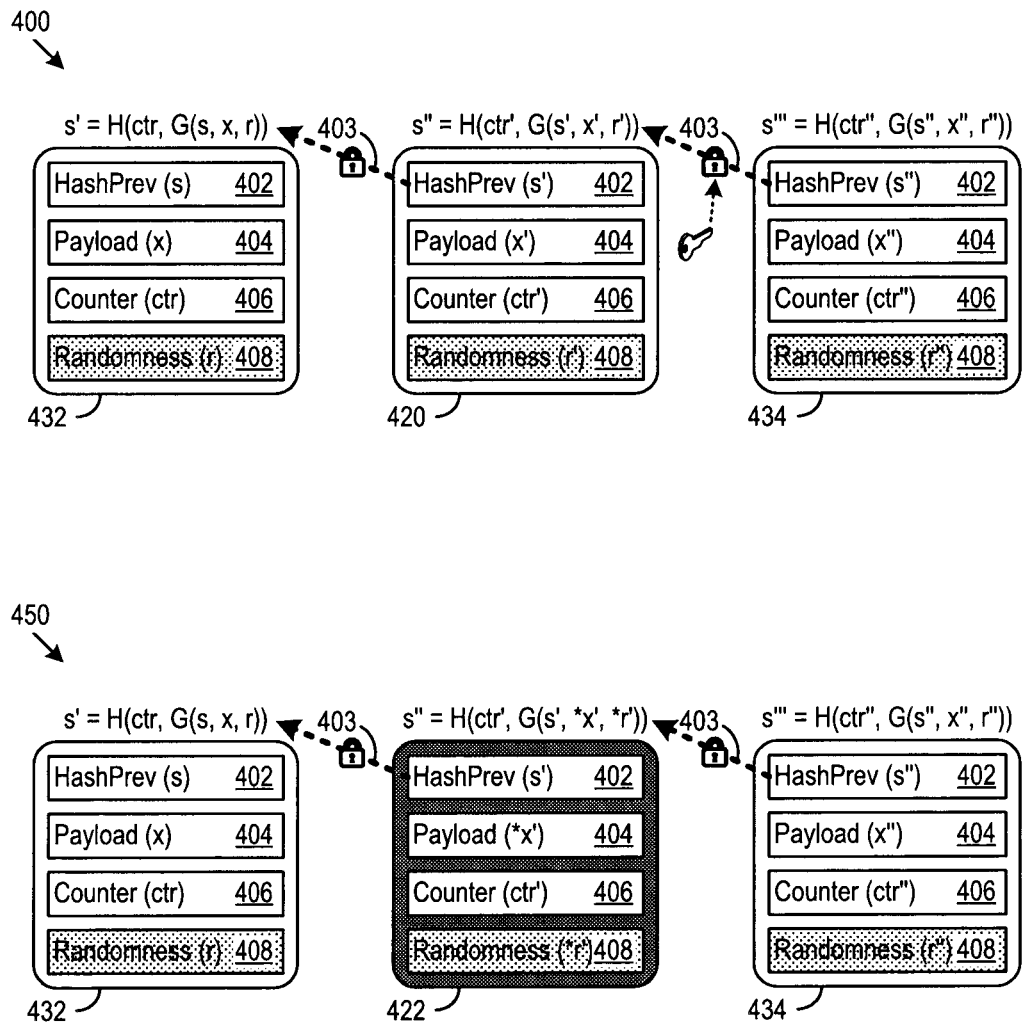
FIG. 4 shows an example blockchain portion paired with an example updated blockchain portion.

For example the informational panel may include a block type, e.g., invocation blocks, chaincode blocks, or other block types; a block identifier such as a sequence number, append date/time, serial or index number, identifier code or other block identifier; a chaincode identifier which may associate the block with a particular section of chaincode; integrity outputs for one or more previous blocks; integrity output for the selected block; block-level structure variables as discussed with respect to FIG. 4; applicable chaincode, or chaincode content; a payload variable list e.g., a listing of the chaincode variables included in the block; an available interaction menu (e.g., rewrite options or other interactions); or other information.

In some implementations, when a rewrite option is selected from the presentation 134 (e.g., the informational panel), the presentation layer may generate a rewrite command in accordance with the selection. For example, the informational panel or other portion of the presentation may accept rewrite input and may have an input field for input of new content to replace the original content of the selected block. Additionally or alternatively, a rewrite command may be addressed directly to the rewrite layer, e.g., from network nodes associated with the received credentials.

The write layer 140 may receive a command associated with the credential at the write layer of the blockchain operation stack, the command specifying an alteration to a selected block of the blockchain (222). Additionally or alternatively, the command may include an append command (when the privilege grant includes an append privilege, as discussed below). For example, the write layer 140 may receive the command from a presentation layer 130 session initiated in association with the credential, from a network node associated with the credential, or other source authorized by the CAL 120 responsive to the credential.

When the privilege grant includes a rewrite privilege, the write layer 140 of the blockchain operation stack may access a key secret associated with the blockchain (224). For example, the write layer 140 may access the key secrets in protected memory via the memory access layer 110.

Responsive to the command and the key secret, the write layer 140 may perform the alteration using a rewrite coding-consistent with an integrity code of the blockchain (226). For example, the write layer 140 may calculate collision data coding-consistent with a validity preserving integrity code of the blockchain. In some implementations, the rewrite may be tamper evident, e.g., responsive to a second rewrite indicating "scar" integrity code or non-tamper evident, e.g., the rewrite may be coding-consistent with all integrity codes (e.g., one or more) that secure the block that was altered.

When the privilege grant includes an append privilege, the write layer 140 may execute append commands associated with the credential (228). The append commands may append a block to the end of the blockchain. As discussed above, in addition to credential authority, the append command may, in some implementations, also need to satisfy a consensus mechanism to result in a valid addition to the blockchain. Append operations may be used to complete blockchain transactions. For example, new chaincode variables representing a transaction may be appended to the blockchain in an invocation type block. Additionally or alternatively, append operations may be used to deploy chaincode. For example, chaincode blocks containing chaincode, which may control the consensus mechanism of the blockchain, may be deployed by the write layer 140 using append transactions. In some cases, authorization from the CAL 120 may control whether chaincode containing blocks may be appended to the blockchain. For example, after a deployment phase, chaincode append operations may be constrained or disallowed.

Figure 3:
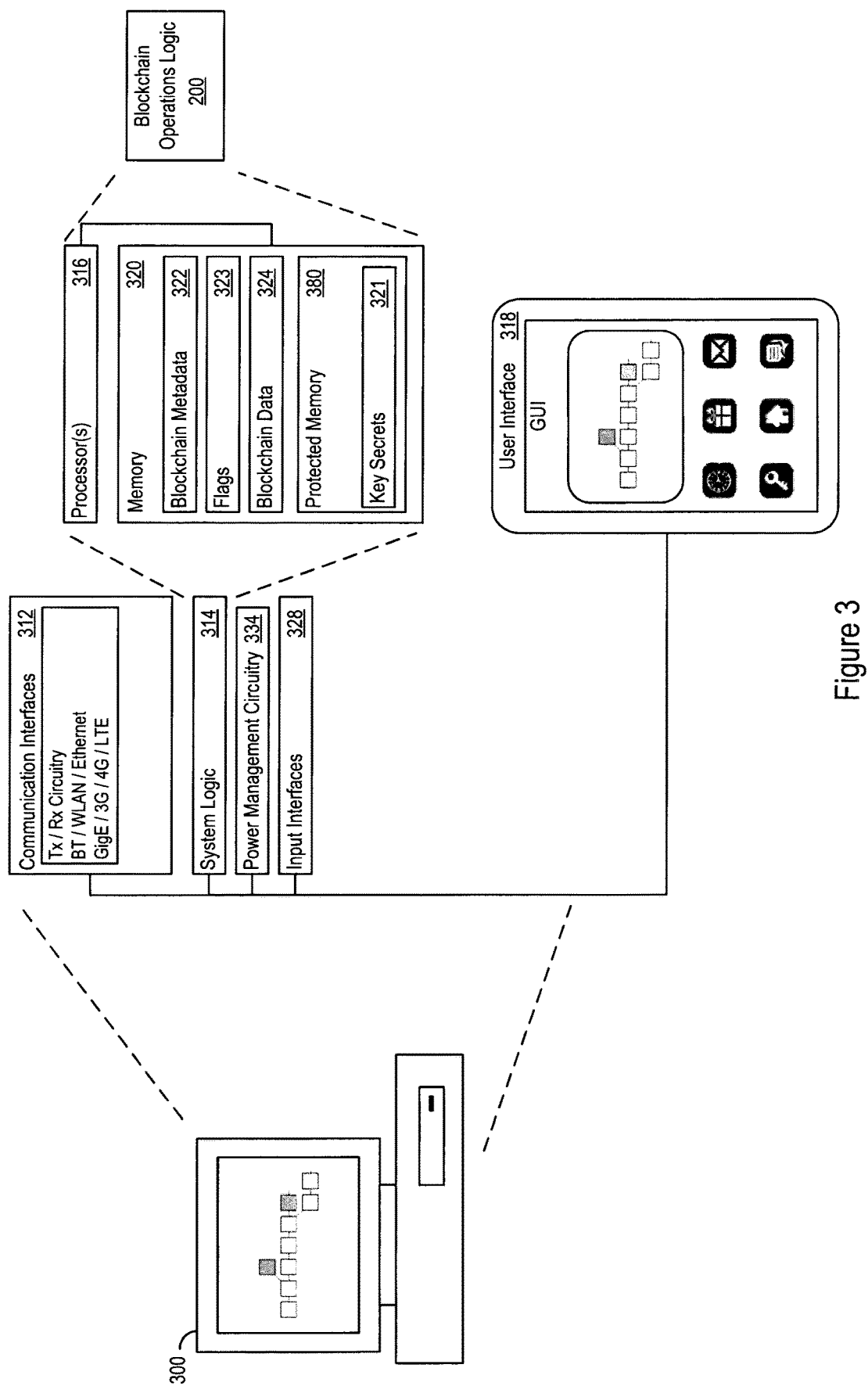
FIG. 3 shows example blockchain operation circuitry.

FIG. 3 shows example blockchain operation circuitry (BOC) 300. The BOC 300 may be used by, for example, via an application programming interface (API) executing blockchain operation via the blockchain operation stack 100. The BOC 300 may include system logic 314 to support reading operations, rewriting operations, and/or append operations to blockchains. The system logic 314 may include processors 316, memory 320, and/or other circuitry, which may be used to implement the blockchain operation logic 200.

The memory 320 may be used to store blockchain metadata 322 and/or blockchain data 324 used in blockchain presentations, rewrites, and block appends. The memory 320 may further store key secrets 321, such as an encryption key value, trapdoor information, or other secret value, that may allow coding-consistent rewriting of a blockchain. In some cases, the key secrets 321 may be stored in protected memory 380, such as encrypted files or data drives, physically secured drives, drives coupled to triggers for anti-theft countermeasures, or self-deleting drives to prevent accidental or surreptitious disclosure of the stored key secrets 321.

The memory 320 may further include applications and structures, for example, coded objects, templates, or one or more other data structures to support verification of updates to blockchains and detect evidence of tampering. The memory may further include flags 323 which may indicate whether particular blockchains can be edited. The BOC 300 may also include one or more communication interfaces 312, which may support wireless, e.g. Bluetooth, Wi-Fi, WLAN, cellular (3G, 4G, LTE/A), and/or wired, ethernet, Gigabit ethernet, optical networking protocols. The communication interface 312 may support communication with other parties making updates to blockchains or performing blockchain transfers. Additionally or alternatively, the communication interface 312 may support secure information exchanges, such as secure socket layer (SSL) or public-key encryption-based protocols for sending and receiving key secrets and CAL credentials. The BOC 300 may include power management circuitry 334 and one or more input interfaces 328.

The BOC 300 may also include a user interface 318 that may include man-machine interfaces and/or graphical user interfaces (GUI). The GUI may be used to present data from the presentation layer 130 to an operator of the BOC 300. Additionally or alternatively, the user interface 318 may be used to present blockchain rewriting or append too tools to the operator, e.g., via the presentation layer 130.

In some cases, the user interface 318 may include a GUI (e.g., implemented via the presentation layer) with tools to facilitate blockchain rewrites and deletions. The GUI tools for rewriting may include "what you see is what you get" tools that allow operators to manipulate the content of the blockchain, e.g., using word-processor-like tools, web-editing-like tools, file-browsing-like tools, or any combination thereof. Additionally or alternatively, the user interface 318 may include command-line editing tools. The tools, whether text or graphic based, may allow operators to access key secrets and perform edits on blockchains for which they are authorized, e.g., by the CAL 120. In some implementations, the tools may deny writing capabilities to operators lacking the proper key secret for the blockchain that they are attempting to edit.

Exemplary Structure at the Block Level

FIG. 4 shows an example blockchain portion 400 paired with an example updated blockchain portion 450. In the example, blockchain portions 400, 450 an outer hash H is paired with an inner hash G. The inner hash may be nested within the outer hash such that the output of the inner hash is provided to the outer hash as an input. In the example blockchain portions 400, 450, the inner hash G may be a chameleon hash function. The outer hash H may be a chameleon hash function or another hash function. The blocks may include a HashPrev (e.g. previous hash) 402 field which may include a store for holding the hash output corresponding to the previous block, for example s, s', s''. The blocks 420, 422, 432, 434 may not necessarily include a hash output based on their own input. However, the hash output for the blocks is shown above the block to demonstrate the linkage 403 to the next block (e.g., the linkage 403 between block 432 and 420 and between 420 and 434). The blocks 420, 422, 432, 434 may further include a Payload 404 field which may hold data (e.g., x, x', x'') secured within the block, such as, transaction information, smart contract content, numerical values, program code, currency denominations, or other secured data.

A counter field 406 may also be included, for example ctr, ctr', ctr''. The counter field 406 may include a counter or nonce that may be used for proof of work (PoW) computation, accounting, block tracking, or other purposes. In cryptocurrency implementations, PoW may be used to verify the validity of a currency award to a particular party. PoW may include solutions to computational problems where the solutions a computationally complex to derive, but comparatively computationally simple to verify. PoW may also be used in smart contracts to verify that a particular party has completed their obligations under the contract.

The Randomness 408 field may be updated when the block is redacted, for example, when a collision is computed. In some cases the Randomness field may hold the third data, (e.g., r, r', r'') that may be paired with the replacement data to allow a non-tamper-evident rewrite to the blockchain. When a block 420 is redacted, the values s', x', ctr', and r' may be replaced by s', *x', ctr', and *r. In the example scenario, s' and ctr' may not necessarily be modified since ctr' may be used by the outer hash to compute the PoW and is the link to the previous block that remains the same. Using a chameleon hash key secret for the inner hash function G, it may be possible to find a collision such that G(s', x', and r')=G(s', *x', and *r'). Accordingly, H(ctr', G(s', x', and r'))=H(ctr', G(s', *x', and *r')). As a result s'' may remain unchanged through redaction. The updated block portion 450 includes the replacement block 422 with values *x' and *r'.

In some implementations, the system may delete a block by replacing $s_{i+1}$ with $s_i$ in $Block_{i+1}$ and then running the redaction process on $Block_{i+1}$. Additionally or alternatively, the system may delete a block by making the value $s_{i+1}$ in $Block_{i+1}$ point to $Block_{i-1}$. In some cases, the ctr value in $Block_{i-1}$ may be changed to maintain coding-consistency with the updated value $s_{i+1}$ in $Block_{i+1}$.

Exemplary Multiple Chain Blockchain

In some implementations, a trusted entity, e.g., an entity authorized by the CAL 120 to preform rewrites, may perform a rewrite that may be concealed to entities other than the entity making the rewrite. For example, users may be unaware that a new blockchain has replaced the original blockchain. That is, users may not be able to detect whether parts of the blockchain were redacted without having old copies of the blockchain to reference.

However, in some implementations, it may be advantageous to make rewrites evident. For example, tamper-evident redactions may be advantageous in systems where redactions are audited, where evidence of redactions is required (e.g., by pre-agreed contract), and/or when evidence of redaction is advantageous or otherwise preferable. In systems that are redaction evident, content removal or modification may leave a rewrite identifier or "scar" (e.g., a rewrite artifact) that may not necessarily be removable by anyone including the trusted parties. However, in some implementations, the scar may be removable by a subset of the trusted parties or through coordination of multiple parties, as discussed below.

In some redaction evident implementations, a single blockchain may include a plurality of chains. For example, a redaction-evident blockchain can include a chain based on the write-locked chain, e.g., a hash function that lacks a key secret or a hash function for which the key secret is unknown, and another chain based on a rewritable blockchain, e.g., a chameleon hash or other rewrite supporting integrity code. In an implementation with write-locked and rewritable chain, if both the write-locked and rewritable chains are intact, then there was no redaction and the blocks are original. If the write-locked chain is broken and the rewritable chain is intact, then there was a redaction by a trusted entity. However, if the rewritable chain is broken, then there was an edit to the blockchain by an untrusted entity and the blockchain may be invalidated. In some cases, if the rewritable chain is broken, the blockchain may be invalidated regardless of the state of the write-locked chain. Accordingly, in such cases, the integrity of the blockchain is ensured by the rewritable chain while the write-lock chain acts as a detection mechanism. Thus, in blockchains supporting rewrites with scar evidence, the validity of the blockchain is logically separated from the creation of a record of tamper.

In some implementations, multiple chains may be used to differentiate among different trusted entities or other credentialed entities. Accordingly, multiple rewriteable chains may be included in a blockchain along with zero or more write-locked chains. In a multiple-trusted entity tracking blockchain, the chain corresponding to the trusted entity that made the redaction will be unbroken while other chains, including chains corresponding to other trusted entities or write-locked chains may be broken. In some implementations, the inclusion of multiple rewritable chains provides the tamper scar or rewrite identifier without an accompanying write-locked chain since only the chain corresponding to the trusted entity that made the edit may be left unbroken. The other chains, although rewritable by other trusted entities, may be broken as a result of the edit. In some cases, a scar may be later removed when another trusted entity or entities in possession of the key to one or more of the other chains ratifies edits made by the earlier trusted party. This may protect the blockchain from untraceable unilateral edits by one party authorized by the CAL 120, but still allow a single authorized party to remove sensitive information quickly without coordination among multiple parties.

Further, in certain schemes, some trusted entities may be authorized to make edits without scars, while other trusted parties may leave scars when making edits. For example, in a multiple rewritable chain scheme, one trusted party may have a key for all chains while other parties have keys for only a portion of the chains. A party with all keys may make edits without scars, while parties with only a portion of the keys may leave scars when editing. The multiple chain scheme may be combined with the distributed key schemes, such that, parties may aggregate their keys to make edits without scars in situations where a party would leave a scar if acting alone.

Figure 5:
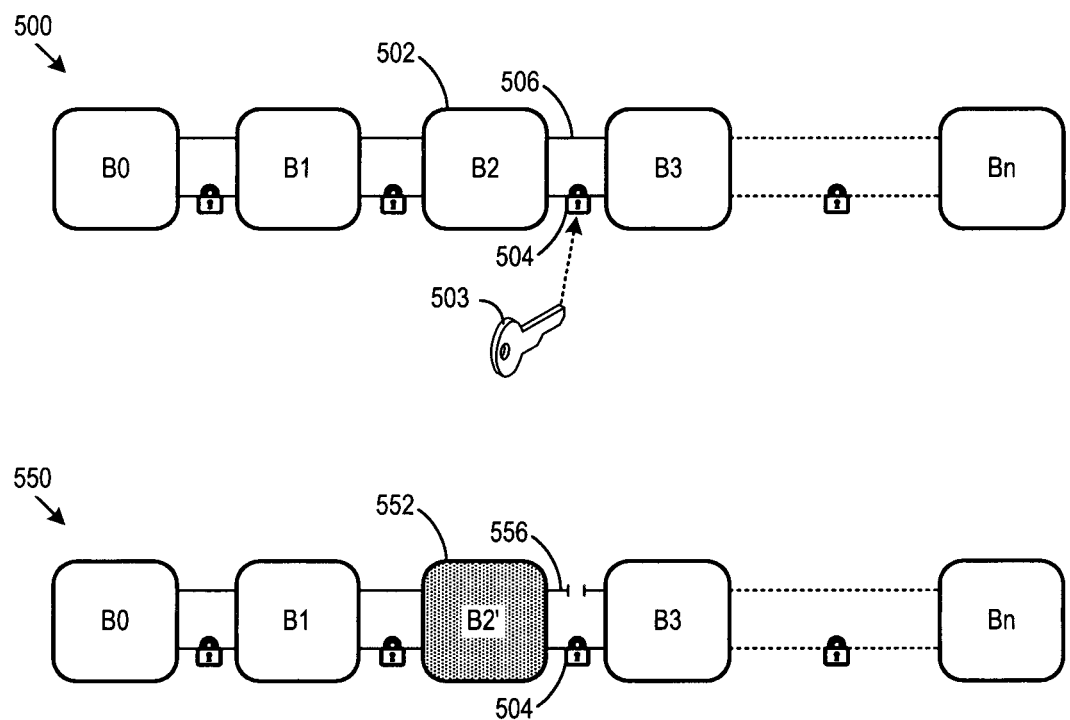
FIG. 5 shows an example dual-link blockchain portion.

FIG. 5 shows an example dual chain blockchain portion 500, 550, where the block B2 502 is modified. The key secret 503 accessed on behalf of one or more authorized parties allows the authorized parties to open the link 504 and change the block B2 502. However, the write-locked link 506, or other link for which the authorized party lacks the key secret, may be broken to signal that a redaction took place. Referring to 550, the old block B2 502, may be removed, but the broken link 556 acts as an indelible mark or scar that provides a persistent record that a redaction to produce new block B2' 552 took place.

Figure 6:
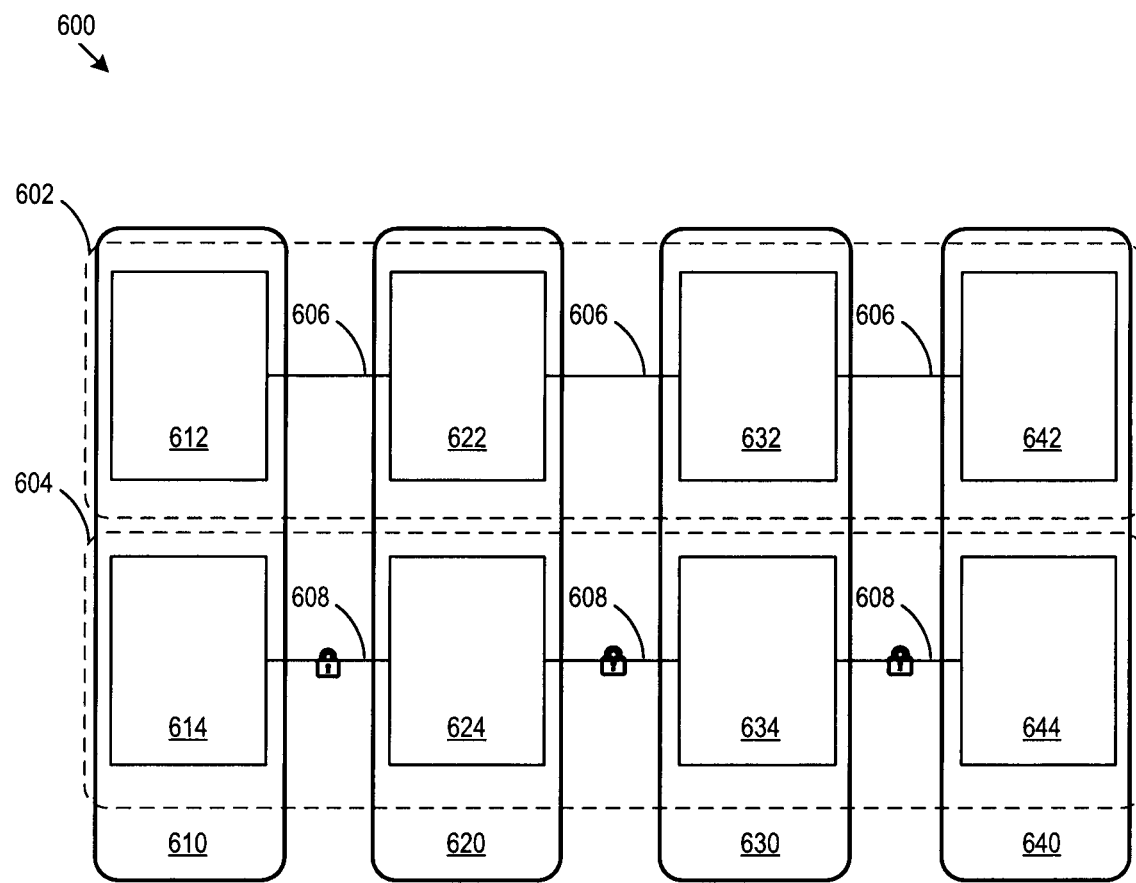
FIG. 6 shows an example hybrid blockchain.

FIG. 6 shows an example hybrid blockchain 600. The hybrid blockchain 600 includes blocks 610, 620, 630, 640 with a core 602 part and a tertiary part 604. The block portions 612, 622, 632, 642 making up the core part 602 are secured by a core integrity code 606 which may not necessarily support non-tamper-evident rewrites by any party. Conversely, the block portions 614, 624, 634, 644 making up the tertiary parts 604 of the blocks 610, 620, 630, 640 may be secured by a tertiary integrity code 608 that supports non-tamper-evident rewrites.

In various implementations, the core 606 and tertiary 608 integrity codes may, respectively, t\ implement multiple chains. For example, the core integrity code 606 or the tertiary integrity code 608 may support scarring, as discussed above, such that valid rewrites may be performed on the parts 602, 604, but those changes still generate evidence of tampering despite being valid. Additionally or alternatively, the core 606 and tertiary 608 integrity codes may support multiple-trusted-party ratification, or require different numbers of key secret portions to support editing. For example, edits to the core parts 602 may depend on ratification by two trusted parties to perform a non-tamper evident rewrite, while non-tamper-evident edits to the tertiary portion may be performed by a single trusted party. For distributed key secret systems, an example system may allow a non-tamper-evident rewrite to the tertiary part 604 using M portions of the key secret, while only allowing non-tamper-evident rewrites to the core part 602 when N portions of the key secret are combined (where N>M).

In an example scenario, the hybrid blockchain could be used to construct a ledger with fully immutable transaction data that is paired with transaction description/comment data that may be rewritten by a select group of curators for the ledger. In some cases, the ledger entries may include size caps or constraints in the type of data that may be entered. Constraining allowed rewrites may frustrate attempts to write irrelevant or malicious content into the immutable ledger portions of the blocks. The description/comment field within the rewritable portions of the blocks may be subject to fewer entry restrictions. However, the curators may alter or remove previously written content in the description/ comments fields without the changes being tamper evident.

The architecture of multiple-link or hybrid blockchains may be used in conjunction with the blockchain operation stack 100 above. For example, an operator on a terminal device (e.g., a local or remote terminal) may access the blockchain operation stack 100 as an API. The blockchain operation stack 100 may control read and write access to the blockchain and generate presentations to serve as user interface features to facilitate interaction between the operator and the blockchain.

Figure 7:
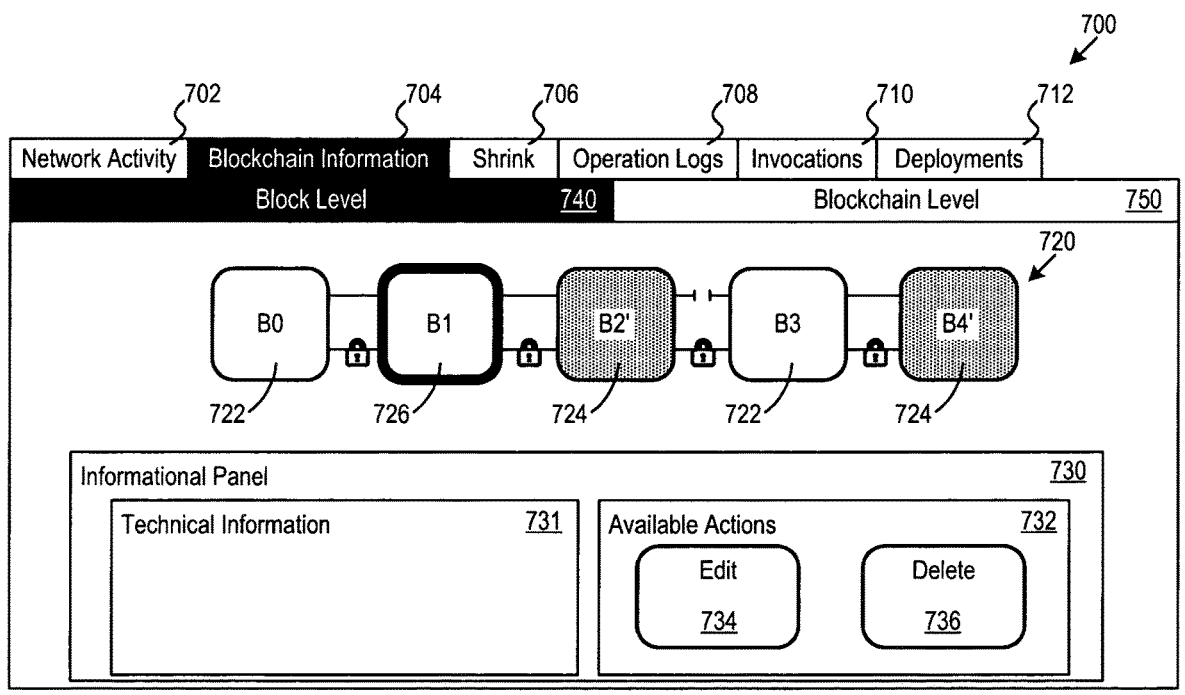
FIG. 7 shows an example user interface.
Figure 7:
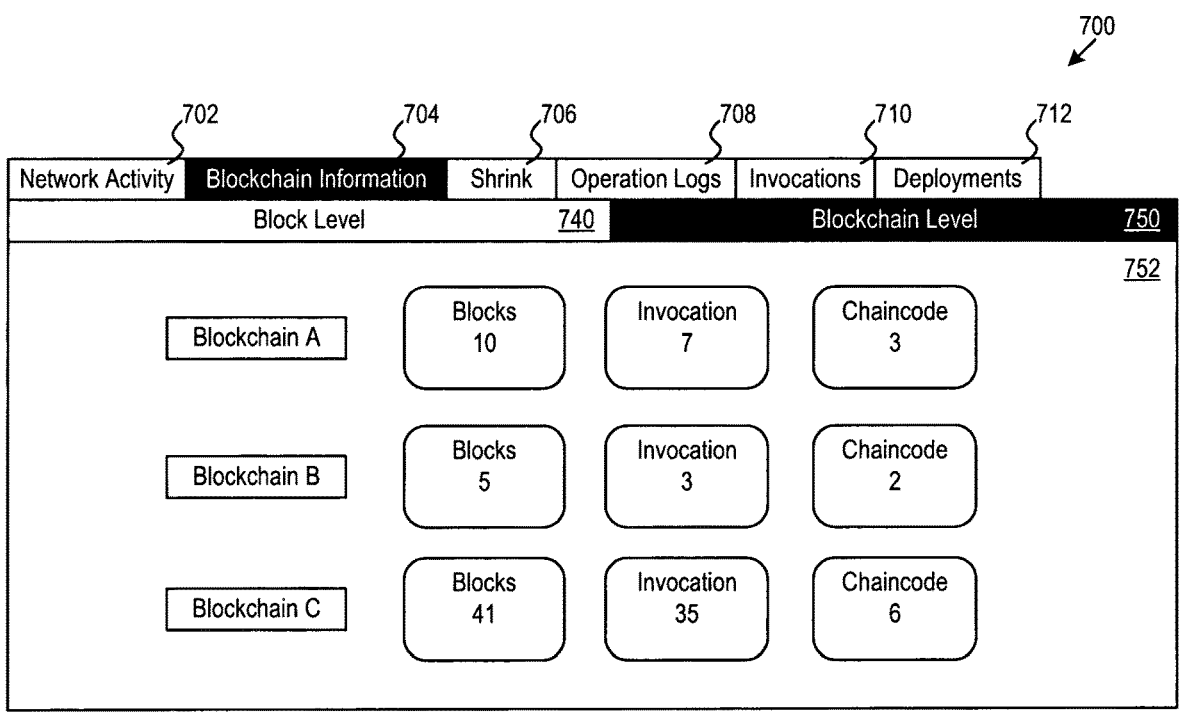

FIG. 7 shows an example user interface 700 which may be generated by the blockchain operation stack 100. The user interface 700 may include multiple tabs which can show network activity (e.g., logons and/or blockchain interactions) 702, blockchain information tab 704, blockchain compression options to merge or compress blocks into fewer blocks (e.g., the "Shrink" tab) 706, operation logs 708, invocation transaction listings for deployed chaincode types 710, and listings of deployed and/or deployable chaincodes 712.

For the blockchain information tab 704, the user interface 700 may display a portion of a blockchain 720 up to the entire blockchain. In some cases, the user interface 700 may display multiple blockchains (or portions thereof) side-by-side. For example, displaying blockchains side-by-side may increase the speed at which an operator may monitor or interact with blockchains for which the operator is authorized.

Within the displayed portion, the blockchain 720 may include blocks 722, 724, 726. The blocks may include unaltered blocks 722 and altered blocks 724 which may be distinguished visually (e.g., an identifier to indicate an edit representation). In this example user interface, altered blocks 724 are highlighted in a color shade that differs from a shade used for displaying blocks 722. Further, an individual block 726 may be selected to display an informational panel 730 associated with that selected block 726. The informational panel 730 may include technical information 731 for the block such as block type, e.g., invocation blocks, chaincode blocks, or other block types; a block identifier such as a sequence number, append date/time, serial or index number, identifier code or other block identifier; a chaincode identifier to associate the block with a particular section of chaincode; integrity outputs for one or more previous blocks; integrity output for the selected block; block-level structure variables as discussed with respect to FIG. 4; applicable chaincode, or chaincode content; a payload variable list (e.g., a listing of the chaincode variables included in the block), or other information.

Further, the informational panel 730 may include available actions 732 for a particular block, for example when rewrites are authorized for the operator's profile, the available actions portion 732 of the informational panel may show rewrite tools. For example, an area for dragging and dropping new content in a blockchain. Additionally or alternatively, the rewrite tools may include a 'edit' button 734 which upon selection may allow for editing of content of the block. For example, the informational panel may display invocation chaincode variables contained in the block. The operator may be allowed to change the variable in the informational panel once the edit button 734 is selected.

Additionally or alternatively, the rewrite tools may include a 'delete' button 736. When the delete button 736 is selected, the user interface may display block content, e.g., such as chaincode variables, to select for deletion. In some cases, entire blocks may be designated for deletion.

In some implementations, the blockchain information tab 704 may include subtabs block level 740 and blockchain level 750. The block level tab 740 may allow viewing of the blocks within the blockchain as discussed above, which the blockchain level tab 750 may display whole blockchain level data for one or more blockchains.

For example, for individual blockchains represented in the blockchain level tab 750, the user interface 700 may display panels 752 showing the number of blocks within a blockchain, the number of chaincode deployment blocks, and/or the number of transactions completed and recorded within the blockchain. In some cases, the user interface 700 may display this information for multiple blockchains in parallel. In some implementations, the operator may select a panel 752 to switch directly to a view of the relevant blocks under the block level tab 740.

Figure 8:
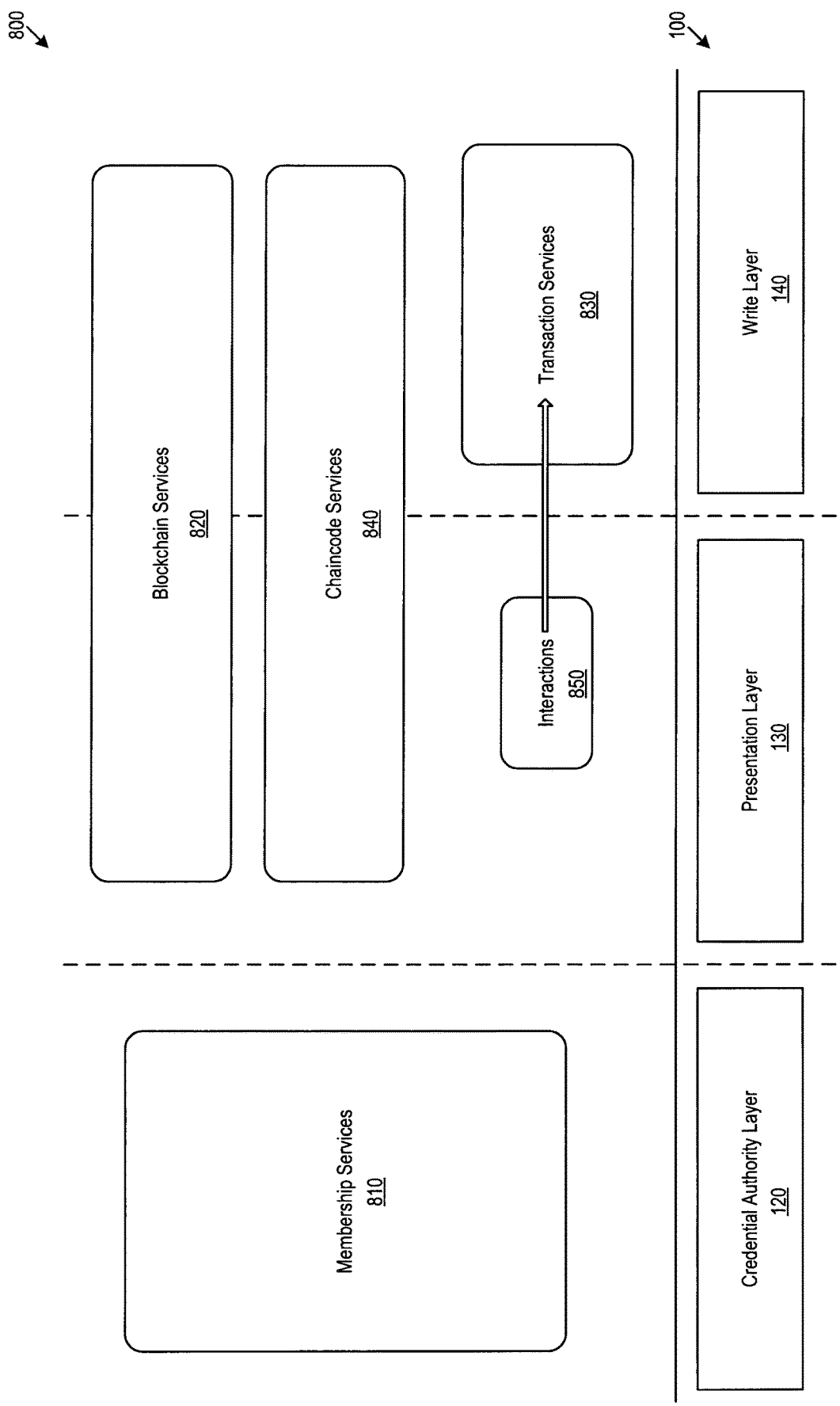
FIG. 8 shows an example blockchain API logical architecture.

FIG. 8 shows an example blockchain API logical architecture (BAPI) 800 which may be implemented using the blockchain operation stack 100. Specifically, the CAL 120, the presentation layer 130, and the write layer 140 may be used to implement the membership services 810, blockchain services 820, transaction services 830, and chaincode services 840 of the BAPI 800. The membership services 810, which may be provided by the CAL 120, manage identity, privacy and confidentiality on the network. Participants register to obtain profiles, which allows the CAL 120, under the logical division of membership services, to issue authority (and access to accompanying tools, such as key secrets, certificates, security keys, or other tools) for preforming interactions 850. In some cases, the membership services provided by the CAL 120 may include profile maintenance tool allowing operators to view transactions pertaining to a particular profiles, e.g., to preform auditing tasks. The operator performing auditing tasks may have an associated profile (e.g., in possession of credentials for the profile) that allows auditing of other profiles maintained by the CAL 120.

Blockchain services 820, which may be provided through interactions with and/or operations of the presentation layer 130 and/or write layer 140, may manage the distributed ledger, e.g., through a peer-to-peer protocol. In an example system, the protocol may be built on HTTP/2. However, other environments may be used. The data structures may provide efficient schemes for maintaining the world state replicated at many participants. For example, blockchain updates may be distributed as differential updates, which may include changes and may, in some cases, omit unchanged blockchain data. Accordingly, the system may avoid additional resource consumption associated with distributing unchanged data to participant nodes. However, in some implementations, unchanged data may be transferred with updates. For example, additional unchanged data may be distributed to support implementation of consensus mechanisms or security protocols that may rely on unchanged data for change verification. Additionally or alternatively, unchanged data may be distributed to cure or prevent data corruption. Different consensus algorithms, which may guarantee consistency, e.g., within a designated tolerance, or within certain conditions, may be implemented on chaincode blocks and configured per deployment. For example, consistency may include tolerating misbehavior with byzantine fault tolerance, tolerating delays and outages with crash tolerance, tolerating censorship with proof-of-work or other tolerance protocols.

Transaction services 830 may be provided through interactions with the presentation layer 130 and/or the write layer 140. The append functionality of the write layer 140 may be used to implement transaction services by allowing transaction variables to be appended to the blockchain upon/after execution.

Chaincode services 840 may be provided through interactions with and/or operations of the presentation layer 130 and/or write layer 140. In an example system, the chaincode services may be secured via CAL 120 and blockchain consensus/immutability features. In some cases, this may provide a lightweight way to sandbox the chaincode execution on validating nodes. In the example system, the chaincode environment may deployed on the blockchain in a "locked down" and secured container with a set of signed base images which contain secure operating system (OS) and chaincode language, runtime and software developer kit (SDK) images.

In some cases, the blockchain may be deployed in a state where it is secured by integrity codes that allow non-tamper-evident rewriting of the blocks in the blockchain by trusted parties in possession of a key secret. However, when the same trusted parties are not in possession of the key secret or otherwise unable to access the key secret, these parties may be unable to rewrite the blockchain in a non-tamper-evident manner.

The system may support deleting key secrets to transform trusted parties into untrusted parties. Further, the system may delete all key secrets for a particular rewriteable blockchain and the rewriteable blockchain may be transformed into an immutable blockchain. In some cases, a rewritable blockchain may be deployed during an initial phase of a blockchain release. After a pre-defined period, an operator-selected period, a pre-defined conditions are met, the system may delete the key secrets and change the trusted parties in to untrusted parties. In some cases, deleting key secrets may proceed in multiple phases in which the system progressively eliminates trusted parties.

In some implementations, the key secrets may be stored on protected memory, e.g., with encrypted content. For example, protected memory 380 may be used to store the key secrets. Deleting key secrets may be implemented by deleting encryption keys that allow decryption of the content of the protected memory. In some cases, deleting encryption keys that allow deciphering may affect a permanent and secure deletion of the key secrets.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations may use the techniques and architectures described above.

A1 In an example, a cryptologic system comprises: a memory configured to store a blockchain, the memory comprising: an altered block; and a successor block comprising: a first integrity output; and a second integrity output; blockchain operation circuitry in data communication with the memory, the blockchain operation circuitry configured to execute a blockchain operation stack comprising: a credential authority layer (CAL), a memory access layer, and a presentation layer, and the blockchain operation circuitry configured to: receive a credential at the CAL, the CAL configured to execute on the blockchain operation circuitry; determine that the credential is associated with a profile maintained by the CAL; determine, at the CAL, a privilege grant for a blockchain, the determining responsive to the profile; access the altered block and the successor block within the blockchain, the accessing performed via the memory access layer of the blockchain operation stack; responsive to a first integrity output, determine that the altered block of the blockchain has been previously rewritten stored within the successor block, the first integrity output coding-inconsistent with the altered block; determine a validity of the altered block, the determining the validity of the altered block responsive to a second integrity output stored within the successor block, and the second integrity output coding-consistent with the altered block; and when the privilege grant includes a reading privilege: generate an edit representation for the altered block, the generating an edit representation for the altered block responsive to determining that the altered block of the blockchain has been previously rewritten; generate a presentation of at least a portion of the blockchain, the presentation including the edit representation; and cause a display of the presentation of at least the portion of the blockchain.

A2 The cryptologic system of example A1, where the blockchain operation circuitry is further configured to: when the privilege grant includes a rewrite privilege: access a key secret associated with the blockchain, the key secret accessed at a write layer of the blockchain operation stack; receive a command associated with the credential at the write layer of the blockchain operation stack, the command specifying an alteration to a selected block of the blockchain; and perform the alteration using a rewrite coding-consistent with a first integrity code of the blockchain, the performing the alteration responsive to the command and the key secret.

A3 The cryptologic system of example A2, where the rewrite is coding-inconsistent with a second integrity code of the blockchain.

A4 The cryptologic system of example A2 or example A3, where the blockchain comprises blocks of multiple types.

A5 The cryptologic system of example A4, where rewrite privilege extends to a first block type, but not a second block type.

A6 The cryptologic system of example A5, where the first block type comprises an invocation block type and the second block type comprises a chaincode block type.

A7 The cryptologic system of any of examples A2-A6, where the alteration comprises an alteration of input variables for a chaincode of the blockchain.

A8 The cryptologic system of any of examples A1-A7, where the edit representation comprises highlighting the altered block within the presentation.

A9 The cryptologic system of any of examples A1-A8, where the edit representation comprises: a first graphical representation of coding-inconsistency with the first integrity output; and a second graphical representation of coding-consistency with the second integrity output.

A10 The cryptologic system of any of examples A1-A9, where the presentation further includes an informational panel associated detailing for a user-input-selected block: a block type, a block identifier, a chaincode identifier, a payload variable list, an available interaction menu, or any combination thereof.

B1 In an example, a method comprises: in a cryptologic system: receiving a credential, at a credential authority layer (CAL) of a blockchain operation stack executing on blockchain operation circuitry; determining that the credential is associated with a profile maintained by the CAL; responsive to the profile, determining, at the CAL, a privilege grant for a blockchain stored within memory of the cryptologic system; accessing an altered block and a successor block within the blockchain via a memory access layer of the blockchain operation stack; responsive to a first integrity output stored within the successor block, determining that the altered block of the blockchain has been previously rewritten, the first integrity output coding-inconsistent with the altered block; determining a validity of the altered block responsive to a second integrity output stored within the successor block, the second integrity output coding-consistent with the altered block; and when the privilege grant includes a reading privilege: responsive to determining that the altered block of the blockchain has been previously rewritten, generating an edit representation for the altered block; generating a presentation of at least a portion of the blockchain including the edit representation; and causing a display of the presentation of at least the portion of the blockchain.

B2 The method of example B1, further comprising: when the privilege grant includes a rewrite privilege: at a write layer of the blockchain operation stack, accessing a key secret associated with the blockchain; receiving a command associated with the credential at the write layer of the blockchain operation stack, the command specifying an alteration to a selected block of the blockchain; and responsive to the command and the key secret, performing the alteration using a rewrite coding-consistent with a first integrity code of the blockchain.

B3 The method of example B2, where using the rewrite comprises: using a rewrite that is coding-inconsistent with a second integrity code of the blockchain.

B4 The method of any of examples B1-B3, where the edit representation comprises: a first graphical representation of coding-inconsistency with the first integrity output; and a second graphical representation of coding-consistency with the second integrity output.

B5 The method of any of examples B1-B4, where the presentation further includes an informational panel associated detailing for a user-input-selected block: a block type, a block identifier, a chaincode identifier, a payload variable list, an available interaction menu, or any combination thereof.

C1 In an example, a product comprises: a machine-readable medium other than a transitory signal; and instructions stored on the machine-readable medium, the instructions, when executed configured to cause a machine to: receive a credential, at a credential authority layer (CAL) of a blockchain operation stack configured to execute on blockchain operation circuitry; determine that the credential is associated with a profile maintained by the CAL; responsive to the profile, determine, at the CAL, a privilege grant for a blockchain stored within memory; access an altered block and a successor block within the blockchain via a memory access layer of the blockchain operation stack; responsive to a first integrity output stored within the successor block, determine that the altered block of the blockchain has been previously rewritten, the first integrity output coding-inconsistent with the altered block; determine a validity of the altered block responsive to a second integrity output stored within the successor block, the second integrity output coding-consistent with the altered block; and when the privilege grant includes a reading privilege: responsive to determining that the altered block of the blockchain has been previously rewritten, generate an edit representation for the altered block; generate a presentation of at least a portion of the blockchain including the edit representation; and cause a display of the presentation of at least the portion of the blockchain.

C2 The product of example C1, where the instructions are further configured to cause the machine to: when the privilege grant includes a rewrite privilege: at a write layer of the blockchain operation stack, access a key secret associated with the blockchain; receive a command associated with the credential at the write layer of the blockchain operation stack, the command specifying an alteration to a selected block of the blockchain; and responsive to the command and the key secret, perform the alteration using a rewrite coding-consistent with a first integrity code of the blockchain.

C3 The product of example C2, where instructions are further configured to cause the machine to apply the rewrite privilege to an invocation block type, but not a chaincode block type.

C4 The product of example C1 or example C2, where the alteration comprises an alteration of input variables for a chaincode of the blockchain.

C5 The product of any of examples C1-C4, where the edit representation comprises highlighting the altered block within the presentation.

D1 A method implemented by operation of a cryptologic system of any of examples A1-A10.

E1 A product comprising instructions stored on a machine readable medium, the instructions configured to cause a machine to implement the method of example D1.

Various implementations have been specifically described. However, many other implementations are also possible. Headings and/or subheadings used herein are intended only to aid the reader with understanding described implementations. The invention is defined by the claims.

What is claimed is:

1. A cryptologic system comprising:
a memory configured to store a blockchain, the memory comprising:
an altered block of an invocation block type; and
a successor block comprising:
a first integrity output; and
a second integrity output;
blockchain operation circuitry in data communication with the memory,
the blockchain operation circuitry configured to execute a blockchain operation stack comprising:
a credential authority layer (CAL),
a memory access layer, and
a presentation layer, and
the blockchain operation circuitry configured to:
receive a credential at the CAL,
the CAL configured to execute on the blockchain operation circuitry;
determine that the credential is associated with a profile maintained by the CAL;
determine, responsive to the profile and at the CAL, a privilege grant for a blockchain by:
denying extension of the privilege grant to a chaincode block type for the blockchain, blocks of the chaincode block type configured to store executable code for operation of the blockchain; and
determining to extend the privilege grant to the invocation block type for the blockchain, blocks of the invocation type configured to store one or more input parameters defining operation of the chaincode;
access the altered block and the successor block within the blockchain,
the accessing performed via the memory access layer of the blockchain operation stack;
responsive to a first integrity output, determine that the altered block of the blockchain has been previously rewritten stored within the successor block, the first integrity output coding-inconsistent with the altered block;
determine a validity of the altered block,
the determining the validity of the altered block responsive to a second integrity output stored within the successor block, and
the second integrity output coding-consistent with the altered block; and
when the privilege grant includes a reading privilege:
generate an edit representation for the altered block,
the generating an edit representation for the altered block responsive to determining that the altered block of the blockchain has been previously rewritten;
generate a presentation of at least a portion of the blockchain,
the presentation including the edit representation; and
cause a display of the presentation of at least the portion of the blockchain.

2. The cryptologic system of claim 1, where the blockchain operation circuitry is further configured to:
when the privilege grant includes a rewrite privilege:
access a key secret associated with the blockchain, the key secret accessed at a write layer of the blockchain operation stack;
receive a command associated with the credential at the write layer of the blockchain operation stack, the command specifying an alteration to a selected block of the blockchain; and
perform the alteration using a rewrite coding-consistent with a first integrity code of the blockchain, the performing the alteration responsive to the command and the key secret.

3. The cryptologic system of claim 2, where the rewrite is coding-inconsistent with a second integrity code of the blockchain.

4. The cryptologic system of claim 2, where the blockchain comprises blocks of multiple types.

5. The cryptologic system of claim 4, where rewrite privilege extends to a first block type, but not a second block type.

6. The cryptologic system of claim 5, where the first block type comprises an invocation block type and the second block type comprises a chaincode block type.

7. The cryptologic system of claim 2, where the alteration comprises an alteration of input variables for a chaincode of the blockchain.

8. The cryptologic system of claim 1, where the edit representation comprises highlighting the altered block within the presentation.

9. The cryptologic system of claim 1, where the edit representation comprises:
a first graphical representation of coding-inconsistency with the first integrity output; and
a second graphical representation of coding-consistency with the second integrity output.

10. The cryptologic system of claim 1, where the presentation further includes an informational panel associated detailing for a user-input-selected block:
a block type, a block identifier, a chaincode identifier, a payload variable list, an available interaction menu, or any combination thereof.

11. A method comprising:
in a cryptologic system:
receiving a credential, at a credential authority layer (CAL) of a blockchain operation stack executing on blockchain operation circuitry;
determining that the credential is associated with a profile maintained by the CAL;
responsive to the profile, determining, at the CAL, a privilege grant for a blockchain stored within memory of the cryptologic system by:
denying extension of the privilege grant to a chaincode block type for the blockchain, blocks of the chaincode block type configured to store executable code for operation of the blockchain; and
determining to extend the privilege grant to the invocation block type for the blockchain, blocks of the invocation block type configured to store one or more input parameters defining operation of the chaincode;
accessing an altered block of an invocation block type and a successor block within the blockchain via a memory access layer of the blockchain operation stack;
responsive to a first integrity output stored within the successor block, determining that the altered block of the blockchain has been previously rewritten, the first integrity output coding-inconsistent with the altered block;
determining a validity of the altered block responsive to a second integrity output stored within the successor block, the second integrity output coding-consistent with the altered block; and
when the privilege grant includes a reading privilege:
responsive to determining that the altered block of the blockchain has been previously rewritten, generating an edit representation for the altered block;
generating a presentation of at least a portion of the blockchain including the edit representation; and
causing a display of the presentation of at least the portion of the blockchain.

12. The method of claim 11, further comprising:
when the privilege grant includes a rewrite privilege:
at a write layer of the blockchain operation stack, accessing a key secret associated with the blockchain;
receiving a command associated with the credential at the write layer of the blockchain operation stack, the command specifying an alteration to a selected block of the blockchain; and
responsive to the command and the key secret, performing the alteration using a rewrite coding-consistent with a first integrity code of the blockchain.

13. The method of claim 12, where using the rewrite comprises:
using a rewrite that is coding-inconsistent with a second integrity code of the blockchain.

14. The method of claim 11, where the edit representation comprises:
a first graphical representation of coding-inconsistency with the first integrity output; and
a second graphical representation of coding-consistency with the second integrity output.

15. The method of claim 11, where the presentation further includes an informational panel associated detailing for a user-input-selected block: a block type, a block identifier, a chaincode identifier, a payload variable list, an available interaction menu, or any combination thereof.

16. A product comprising:
a machine-readable medium other than a transitory signal; and
instructions stored on the machine-readable medium, the instructions, when executed configured to cause a machine to:
receive a credential, at a credential authority layer (CAL) of a blockchain operation stack configured to execute on blockchain operation circuitry;
determine that the credential is associated with a profile maintained by the CAL;
responsive to the profile, determine, at the CAL, a privilege grant for a blockchain stored within memory by:
denying extension of the privilege grant to a chaincode block type for the blockchain, blocks of the chaincode block type configured to store executable code for operation of the blockchain; and
determining to extend the privilege grant to the invocation block type for the blockchain, blocks of the invocation block type configured to store one or more input parameters defining operation of the chaincode;

access an altered block of the invocation block type and a successor block within the blockchain via a memory access layer of the blockchain operation stack;

responsive to a first integrity output stored within the successor block, determine that the altered block of the blockchain has been previously rewritten, the first integrity output coding-inconsistent with the altered block;

determine a validity of the altered block responsive to a second integrity output stored within the successor block, the second integrity output coding-consistent with the altered block; and when the privilege grant includes a reading privilege:
responsive to determining that the altered block of the blockchain has been previously rewritten, generate an edit representation for the altered block;
generate a presentation of at least a portion of the blockchain including the edit representation; and
cause a display of the presentation of at least the portion of the blockchain.

17. The product of claim 16, where the instructions are further configured to cause the machine to:

when the privilege grant includes a rewrite privilege:
at a write layer of the blockchain operation stack, access a key secret associated with the blockchain;
receive a command associated with the credential at the write layer of the blockchain operation stack, the command specifying an alteration to a selected block of the blockchain; and
responsive to the command and the key secret, perform the alteration using a rewrite coding-consistent with a first integrity code of the blockchain.

18. The product of claim 17, where instructions are further configured to cause the machine to apply the rewrite privilege to an invocation block type, but not a chaincode block type.

19. The product of claim 17, where the alteration comprises an alteration of input variables for a chaincode of the blockchain.

20. The product of claim 16, where the edit representation comprises highlighting the altered block within the presentation.

* * * * *

UNITED STATES PATENT AND TRADEMARK OFFICE
CERTIFICATE OF CORRECTION

PATENT NO. : 11,461,245 B2  
APPLICATION NO. : 16/764786  
DATED : October 4, 2022  
INVENTOR(S) : Elena Yurievna Medvedeva et al.

Page 1 of 1

It is certified that error appears in the above-identified patent and that said Letters Patent is hereby corrected as shown below:

On the Title Page

Item (73) Assignee, under "Accenture Global Solutions Limited, Dublin (IE)" add additional Assignee --GSC Secrypt, LLC, Hoboken, NJ (US)--

Signed and Sealed this  
Twenty-fifth Day of June, 2024

Katherine Kelly Vidal  
*Director of the United States Patent and Trademark Office*